US009645792B2

(12) United States Patent
Argade et al.

(10) Patent No.: US 9,645,792 B2
(45) Date of Patent: May 9, 2017

(54) EMULATION OF FUSED MULTIPLY-ADD OPERATIONS

(71) Applicant: QUALCOMM Incorporated, San Diego, CA (US)

(72) Inventors: Pramod Vasant Argade, San Diego, CA (US); Andrew Evan Gruber, Arlington, MA (US); Chiente Ho, Santa Clara, CA (US); Stewart Griffin Hall, San Diego, CA (US); Lin Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 282 days.

(21) Appl. No.: 14/461,890

(22) Filed: Aug. 18, 2014

(65) Prior Publication Data

US 2016/0048374 A1    Feb. 18, 2016

(51) Int. Cl.
*G06F 7/544* (2006.01)
*G06F 7/483* (2006.01)

(52) U.S. Cl.
CPC ............ *G06F 7/5443* (2013.01); *G06F 7/483* (2013.01)

(58) Field of Classification Search
None
See application file for complete search history.

(56) References Cited

U.S. PATENT DOCUMENTS

| 5,880,984 | A | 3/1999 | Burchfiel et al. |
| 6,571,266 | B1 * | 5/2003 | Bass ................... G06F 7/5443 |
| | | | 708/501 |
| 8,037,118 | B2 | 10/2011 | Quinnell et al. |
| 8,386,756 | B2 | 2/2013 | Schwarz et al. |
| 8,577,948 | B2 | 11/2013 | Srinivasan et al. |
| 2011/0040815 | A1 | 2/2011 | Penton et al. |
| 2012/0011181 | A1 * | 1/2012 | Samy ...................... G06F 7/483 |
| | | | 708/204 |

(Continued)

OTHER PUBLICATIONS

Goldberg "What Every Computer Scientist Should Know About Floating-Point Arithmetic", ACM Computing Surveys, ACM, New York, NY, US, US, vol. 23, No. 1, Mar. 1991, pp. 5-48, XP000984710, ISSN: 0360-0300.

(Continued)

*Primary Examiner* — Michael D Yaary
(74) *Attorney, Agent, or Firm* — Shumaker & Sieffert, P.A.

(57) ABSTRACT

At least one processor may emulate a fused multiply-add operation for a first operand, a second operand, and a third operand. The at least one processor may determine an intermediate value based at least in part on multiplying the first operand with the second operand, determine at least one of an upper intermediate value or a lower intermediate value, wherein determining the upper intermediate value comprises rounding, towards zero, the intermediate value by a specified number of bits, and wherein determining the lower intermediate value comprises subtracting the intermediate value by the upper intermediate value, determine an upper value and a lower value based at least in part on adding or subtracting the third operand to one of the upper intermediate value or the lower intermediate value, and determine an emulated fused multiply-add result by adding the upper value and the lower value.

30 Claims, 5 Drawing Sheets

(56) References Cited

U.S. PATENT DOCUMENTS

| | | | |
|---|---|---|---|
| 2012/0072703 A1* | 3/2012 | Srinivasan | G06F 9/3001 712/221 |
| 2013/0268794 A1 | 10/2013 | Hancock | |
| 2013/0311532 A1* | 11/2013 | Olsen | G06F 9/30025 708/491 |
| 2014/0006467 A1 | 1/2014 | Samudrala et al. | |

OTHER PUBLICATIONS

International Search Report and Written Opinion from International Application No. PCT/US2015/042235, dated Oct. 26, 2015, 12 pp.

Response to International Search Report and Written Opinion, dated Oct. 26, 2015 from International Application No. PCT/US2015/042235, filed on Jun. 8, 2016, 6 pp.

Second Written Opinion from International Application No. PCT/US2015/042235, dated Jul. 6, 2016, 5 pp.

Response to Second Written Opinion dated Jul. 6, 2016, from International Application No. PCT/US2015/042235, filed on Aug. 29, 2016, 4 pp.

International Preliminary Report on Patentability from international application No. PCT/US2015/042235, mailed Nov. 17, 2016, 7 pp.

\* cited by examiner

EMULATION OF FUSED MULTIPLY-ADD OPERATIONS

TECHNICAL FIELD

This disclosure relates to emulation of fused multiply-add operations in computer processing.

BACKGROUND

Fused Multiply-Add (FMA) is a required operation in IEEE standard 754-2008 for floating point arithmetic that can speed up and improve the accuracy of computations, such as dot-product, matrix multiplication, Newton-Raphson, and the like. Given operands a, b, and c, the FMA operation operates to multiply operands a and b and to add the product of a and b to c. The sum of the product of a and b and c is rounded to nearest even (RTE) to produce the final result as follows: result=RTE((a*b)+c).

An unfused multiply-add operation may approximate the results of an FMA operation. Given operands a, b, and c, the unfused multiply-add operation operates to multiply operands a and b, rounds to nearest even the product of a and b, and adds the rounded product of a and b to c to produce the final result as follows: result=RTE(RTE(a*b)+c).

SUMMARY

This disclosure presents techniques for emulating fused multiply-add (FMA) operations via the use of assist instructions. According to the techniques of this disclosure, FMA operations may be emulated via assist instructions such that existing hardware for performing unfused multiply-add operations may be used to emulate fused multiply-add operations without requiring other specialized hardware.

In one example of the disclosure, a method for emulating a fused multiply-add operation for a first operand, a second operand, and a third operand may include determining, by at least one processor, an intermediate value based at least in part on multiplying a first operand with a second operand. The method may further include determining, by the at least one processor, at least one of an upper intermediate value or a lower intermediate value, wherein determining the upper intermediate value comprises rounding, towards zero, the intermediate value by a specified number of bits, and wherein determining the lower intermediate value comprises subtracting the intermediate value by the upper intermediate value. The method may further include determining, by the at least one processor, an upper value and a lower value based at least in part on adding a third operand to one of the upper intermediate value or the lower intermediate value. The method may further include determining, by the at least one processor, an emulated fused multiply-add result for the first operand, the second operand, and the third operand by adding the upper value and the lower value.

In another example, an apparatus for emulating a fused multiply-add operation for a first operand, a second operand, and a third operand may include a memory configured to store a first operand, a second operand, and a third operand. The apparatus may further include at least one processor configured to: determine an intermediate value based at least in part on multiplying the first operand with the second operand; determine at least one of an upper intermediate value or a lower intermediate value, wherein determining the upper intermediate value comprises rounding, towards zero, the intermediate value by a specified number of bits, and wherein determining the lower intermediate value comprises subtracting the intermediate value by the upper intermediate value; determine an upper value and a lower value based at least in part on adding the third operand to one of the upper intermediate value or the lower intermediate value; and determine an emulated fused multiply-add result for the first operand, the second operand, and the third operand by adding the upper value and the lower value.

In another example, an apparatus for emulating a fused multiply-add operation for a first operand, a second operand, and a third operand may include means for determining an intermediate value based at least in part on multiplying a first operand with a second operand. The apparatus may further include means for determining, by the at least one processor, at least one of an upper intermediate value or a lower intermediate value, wherein the means for determining the upper intermediate value comprises means for rounding towards zero the intermediate value by a specified number of bits, and wherein the means for determining the lower intermediate value comprises means for subtracting the intermediate value by the upper intermediate value. The apparatus may further include means for determining, by the at least one processor, an upper value and a lower value based at least in part on adding a third operand to one of the upper intermediate value or the lower intermediate value. The apparatus may further include means for determining, by the at least one processor, an emulated fused multiply-add result for the first operand, the second operand, and the third operand by adding the upper value and the lower value.

In another example of the disclosure, a computer-readable storage medium may store instructions that, when executed, cause one or more programmable processors to: determine an intermediate value based at least in part on multiplying a first operand with a second operand; determine at least one of an upper intermediate value or a lower intermediate value, wherein determining the upper intermediate value comprises rounding, towards zero, the intermediate value by a specified number of bits, and wherein determining the lower intermediate value comprises subtracting the intermediate value by the upper intermediate value; determine an upper value and a lower value based at least in part on adding the third operand to one of the upper intermediate value or the lower intermediate value; and determine an emulated fused multiply-add result for the first operand, the second operand, and the third operand by adding the upper value and the lower value.

The details of one or more examples are set forth in the accompanying drawings and the description below. Other features, objects, and advantages will be apparent from the description and drawings, and from the claims.

DETAILED DESCRIPTION

In general, this disclosure describes techniques for emulating fused multiply-add (FMA) operations via assist instructions such that FMA operations may be performed using existing multiplication and addition hardware without the need for a specialized adder to add the intermediate product of the first and second operands with the third operand. Because the intermediate product of the first and second operands may comprise more bits than either the first operand or the second operand alone, instead of using a specialized adder hardware to sum the intermediate product and the third operand, a processor may divide the intermediate product into an upper portion and a lower portion, so that the third operand may be added to the upper portion or the lower portion via normal adder hardware, and the upper portion and the lower portion may be combined to provide an emulated fused multiply-add result.

Figure 1:
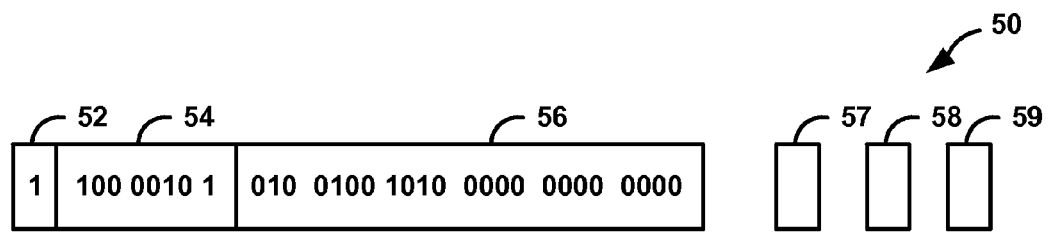
FIG. 1 is a block diagram illustrating an example floating point number format.

Processors such as a central processing unit (CPU), a graphics processing unit (GPU), and the like may perform FMA operations that operate on floating point values. FIG. 1 is a conceptual diagram illustrating an example floating point format. As shown in FIG. 1, floating point number 50, with value −82.3125 may be represented in 32-bit IEEE 754-2008 floating point format. Such a 32-bit floating format may be considered a single-precision format, while a 64-bit floating point format may be considered a double-precision format, and a 16-bit floating point format may be considered a half-precision format. A single-precision IEEE 754-2008 floating point format (i.e., a 32-bit floating point number), such as floating point number 50, may include sign bit 52, exponent 54, and mantissa 56. Sign bit 52 may be a single bit of the 32-bit number, exponent 54 may include 8 bits of the 32-bit number, and mantissa 56 may include 23 bits of the 32-bit number.

Sign bit 52 may be 1 if the sign of floating point number 50 is negative and may be 0 if the sign of floating point number 50 is positive, as one example, or vice-versa, as another example. Exponent 54 may have a bias of 127, such that an unbiased exponent may be calculated from the value of exponent 54 by subtracting 127 from the value of exponent 54. Mantissa 56 may have its integer bit hidden. For example, the floating point value −82.3125 may be equal to $-1.0100100101_2 * 2^6$. In this example, sign bit 52 may be set to 1. Exponent 54 may be $10000101_2$, which is 133 (i.e., 6+127) due to a bias of 127 in exponent 54, and mantissa 56 may be $01001001010000000000000_2$ because the integer bit 1 of $1.0100100101_2$ may be hidden. In this way, mantissa 56 may represent a 24-bit value even though mantissa 56 may take up 23 bits of floating point number 50.

A processor may also keep track of guard bit 57, round bit 58, and sticky bit 59 during floating point computation. Guard bit 57, round bit 58, and sticky bit 59 may be populated while shifting mantissa 56 during normalization and rounding of mantissa 56. For example, if the value of mantissa 56 is 110011, a rightwards shift of 110011 may result in a value of 011001, and guard bit 57 may be set to 1 to store the rightmost bit that was shifted. A subsequent rightwards shift of 011001 may result in a value of 001100, and the 1 in guard bit 57 may be now stored in round bit 58, and guard bit 57 may be set to 1 to store the rightmost bit that was shifted. A subsequent rightwards shift of 001100 may result in a value of 000110, and the 1 stored in round bit 58 may be shifted to being stored in sticky bit 59, the 1 stored in the guard bit 57 may be shifted to being stored in round bit 58, and guard bit 57 may be set 0 to store the rightmost bit that was shifted. A subsequent rightwards shift of 000110 may result in a value of 000011. In this case, once sticky bit is set to 1, it may remain 1 regardless of the values of round bit 58. Therefore, the 1 stored in the sticky bit 59 remains in sticky bit 59, the 1 stored in round bit 58 may be dropped, the 0 stored in guard bit 57 may be shifted to being stored in round bit 58, and guard bit 57 may be set to 0 to store the rightmost bit that was shifted. As can be seen, a 1 may be shifted first into the guard bit 57, then into round bit 58, and then sticky bit 59. Once a 1 is shifted into sticky bit 59, the 1 may remain in sticky bit 59 regardless of additional shifts, while the bit stored in round bit 58 may simply drop off upon another rightward shift. Alternatively, sticky bit 59 may be the result of performing an OR operation on all of the bits that have been shifted to the right of round bit 58.

Floating point number 50 may be rounded in a number of ways, for example, using one of the rounding modes specified in IEEE754-2008. Rounding floating point number 50 may include rounding mantissa 56 to a specified number of bits. The processor may shift mantissa 56 rightwards and may adjust the value of exponent 54 to compensate for the shift. In round-to-nearest-even rounding mode, a number is rounded to the nearest value. If the number falls midway between two equally nearest values, it is rounded to the nearest value with an even least significant bit in the round-to-nearest-even rounding mode.

Rounding floating point number 50 towards zero by a specified number of bits may truncate floating point number 50 by dropping guard bit 57, round bit 58 and sticky bit 59. Furthermore, if the floating point number 50 is the intermediate result of an addition, the addition of the 24-bit mantissas of two operands may result in a 25-bit mantissa, in addition to guard bit 57, round bit 58, and sticky bit 59. In this case the intermediate result will have to be normalized. To accomplish this, the processor may shift mantissa 56 of floating point number 50 rightwards by one bit, and may also increment exponent 54 of floating point number 50 by one. Similarly, if the floating point number 50 is intermediate result of subtraction, the subtraction of 24 bits of mantissa of two operands may result in 24 bits of mantissa, with one or more of the operands' most significant bits being zero. In this case, the intermediate result may be normalized by being shifted left until the most significant bit of the mantissa becomes 1, and the exponent may be correspondingly decremented by the magnitude of the shift.

The result rounding of a floating point number, such as floating point number 50, to nearest even may be based at least in part upon the values of guard, round, and sticky bits 57-59, respectively. Note that rounding is performed after normalization. In the case of round-to-nearest-even (RTE), 1 is added to 24 bit mantissa if the guard bit is one and round bit and/or sticky bit is one. Furthermore, if the least significant bit of the 24 bits mantissa is 1, then 1 is added to LSB of the mantissa if guard bit is set and round and sticky bits are zero. In the case of round-to-odd (RTO), 1 is "OR"ed into the least significant bit of 24 bit mantissa if any one or more bits guard, round, sticky is 1.

As discussed above, an FMA operation may operate on sets of three floating point operands. Table 1 shows the steps of an exemplary FMA operation. Given operands op0=$0x76744000_{16}$, op1=$0x2721A200_{16}$, and op2=$0x2088E3EF_{16}$, the processor may determine FMA(op1, op2, op3)=RTE((op1*op2)+op3):

TABLE 1

| Description | Unbiased Exponent | Normalized Mantissa | Guard Bit | Round Bit | Sticky Bit |
|---|---|---|---|---|---|
| op0 | 109 | 0xF44 000 | | | |
| op1 | −49 | 0xA1A 200 | | | |
| op2 | −62 | 0x88E 3EF | | | |
| p = op0 * op1 | 60 | 0x9A3 6D0 800 000 | | | |
| n = Normalize p | 61 | 0x9A3 6D0 800 000 | 0 | 0 | 0 |
| t = op2 >> 123 | 61 | 0x000 000 000 000 | 0 | 0 | 1 |
| sum = n + t | 61 | 0x9A3 6D0 800 000 | 0 | 0 | 1 |
| Normalize sum | 61 | 0x9A3 6D0 800 000 | 0 | 0 | 1 |
| 32-bit Rounding sum | 61 | 0x9A3 6D0 | 1 | 0 | 1 |
| 32-bit FMA | 61 | 0x9A3 6D1 | | | |
| FMA Result | | 0x5E1A36D1 | | | |

As shown in Table 1 above, a processor may multiply op0 by op1. In response to multiplying op0 by op1 to result in value p, the processor may normalize the resulting value p to result in value n by incrementing the exponent by one. Subsequently, the processor may add op2 to n. To add two floating point values, the processor may right shift the smaller one of the two floating point values to be added so that their exponents are the same. Because value n has an unbiased exponent of 61, a processor may shift op2 having an unbiased exponent of −62 rightwards by 123 to result in value t having an unbiased exponent of 61 that matches the unbiased exponent of value n. In response to shifting op2, the processor may sum values n and t, normalize the sum, and may round to nearest even the sum of n and t to the 32-bit result consisting of 24 bit mantissa, resulting in a FMA result of $0x5E1A36D1_{16}$.

As shown in FIG. 1, a single-precision IEEE 754-2008 floating point value, such as floating point number 50, may include a 23-bit mantissa 56. As discussed above, because mantissa 56 may have its integer bit hidden, the 23-bit mantissa 56 may actually represent a 24-bit mantissa value. Accounting for the guard, round, and sticky bits, a 27-bit adder may be utilized to add two single-precision (i.e., 32-bit) floating point values, including adding two 24-bit mantissa values and two sets of guard, round, and sticky bits.

Because the processor multiplies a first operand and a second operand together to produce an intermediate value that is added with a third operand to perform the FMA operation, multiplying the first operand by the second operand, including multiplying two 24-bit mantissa values, may produce an intermediate value with a 48-bit mantissa value. Accounting for the 48-bit mantissa value, the processor may be required to include a 51-bit adder to add the 48-bit intermediate value with the 24-bit mantissa of the third operand.

Potential disadvantages of incorporating a 51-bit adder to a processor instead of a 27-bit adder may include more space and power requirements for the processor. Furthermore, critical path issues may arise due to carrying a sum over such a large number of bits. One approach to approximate the results of an FMA operation without the need for an extra adder, to handle the 51-bit addition, may be an unfused multiply-add operation. As discussed above, an unfused multiply-add operation may round the 48-bit intermediate value that is the product of the 24-bit mantissas of op0 and op1 back down to 24 bits and adding the 24-bit intermediate value with op2, followed by rounding the result of the sum.

In some examples, processors may include hardware that may be able to perform unfused multiply-add operations in place of FMA operations. Such hardware may include digital circuits, hardware multipliers, adders, hardware logic, and the like to perform unfused multiply-add operations. In some examples, the hardware may comprise a hardware pipeline. Because in an unfused multiply-add operation the intermediate product of first and second operands is rounded down before the intermediate product is summed with the third operand, the hardware for performing unfused multiply-add operations may not include a specialized adder for adding large floating point values. For example, in the example shown in Table 1, the processor may round the 48-bit mantissa resulting from multiplying op0 and op1 down to 24 bits before op3 is added to the product.

However, unfused multiply-add operations may sometimes provide inaccurate results that are different from the results of FMA operations. In the example shown in Table 1, if the processor instead computes the unfused multiply-add result of op1, op2, and op3, the result may instead be $0x5E1A36D0_{16}$, which is different from the result of the FMA operation of $0x5E1A36D1_{16}$. For example, because in unfused multiply-add the mantissa of value n that is the result of normalized value p may be rounded down to the 24-bit mantissa value $0x9A36D0_h$, the mantissa of the sum n+t may be $0x9A36D0_h$ instead of $0x9A36D0800000_h$. Thus while the guard, round, and sticky bits may be 1 0 0 as a result of normalizing the mantissa $0x9A36D0800000_h$, this value is rounded to 0x9A36D0 immediately following the multiplication in unfused multiply-add and the guard bit is lost. The guard, round, and sticky bits may be 001 during the add stage of the unfused multiply-add. Accordingly, the result of rounding to nearest even the mantissa $0x9A36D0_h$ with guard, round, and sticky bit values of 001 may be $0x9A36D0_h$, which results in an unfused multiply-add result of $0x5E1A36D0_{16}$.

In accordance with aspects of the present disclosure, a processor may use the same existing hardware used for computing unfused multiply-add operations to emulate FMA operations with more accuracy than unfused multiply-add operations. By utilizing existing adder hardware to emulate FMA operations, a processor may not need to provide an additional 51-bit adder to perform FMA operations for single precision floating point numbers. At least one processor may be configured to: determine an intermediate value based at least in part on multiplying a first operand with a second operand; determine at least one of an upper intermediate value or a lower intermediate value, wherein determining the upper intermediate value comprises rounding, towards zero, the intermediate value by a specified number of bits, and wherein determining the lower intermediate value comprises subtracting the intermediate value by the upper intermediate value; determine an upper value and a lower value based at least in part on adding/subtracting the appropriate bits of the third operand to one of the upper intermediate value or the lower intermediate value; and determine an emulated fused multiply-add result for the first operand, the second operand, and the third operand by adding the upper value and the lower value. Whether the processor adds or subtracts the third operand may be based at least in part on whether the signs of the intermediate product and third operand are the same or different.

As discussed above, for single precision floating point values, the product of the two 24-bit mantissas of a first operand and a second operand may produce a 48-bit intermediate value, and that a 51-bit adder may be required to perform an FMA operation by adding the 48-bit mantissa of the intermediate value and the 24-bit mantissa of the third operand. Instead, to emulate an FMA operation without the additional 51-bit adder, a processor may divide the mantissa of the intermediate value into an upper portion of bits and a lower portion of bits. For example, for the 48-bit mantissa of the intermediate value, a processor may divide the 48-bit mantissa of the intermediate value evenly into an upper portion of bits that includes the upper 24 bits [47-24] of the 48-bit mantissa and a lower portion of bits that includes the lower 24 bits [23-0] of the 48-bit mantissa.

The processor may be configured to determine at least one of an upper intermediate value and a lower intermediate value, wherein the upper intermediate value's mantissa comprises the upper 24 bits of the 48-bit mantissa, and wherein the lower intermediate value comprises the lower 24 bits of the 48-bit mantissa. The processor may determine an upper value and a lower value based at least in part on adding the third operand to one of the upper intermediate value and the lower intermediate value, and may further determine an emulated fused multiply-add result for the first operand, the second operand, and the third operand by adding the upper value and the lower value.

Figure 2:
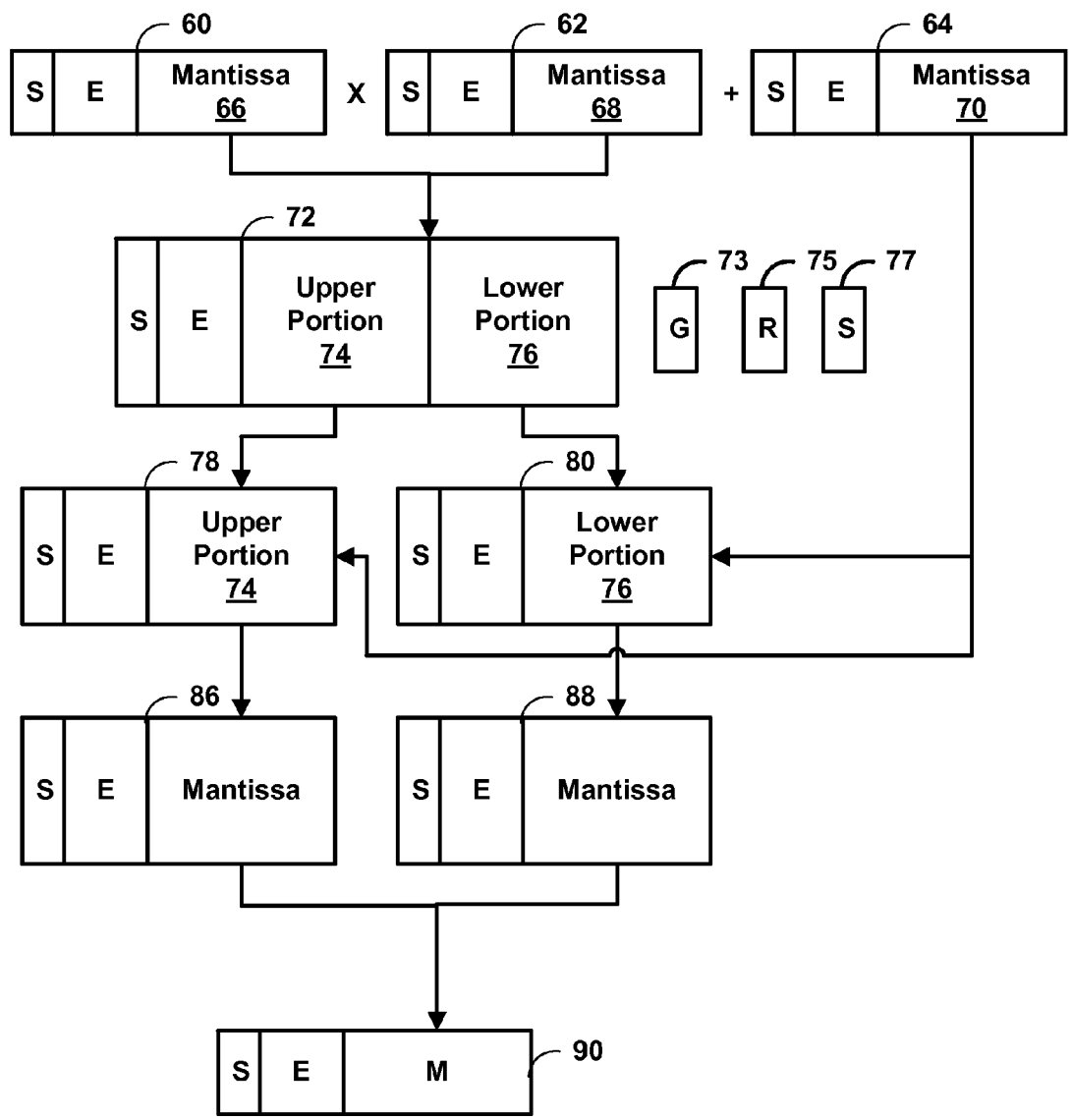
FIG. 2 is a block diagram illustrating an example technique for emulating fused multiply-add operations.

FIG. 2 is a block diagram illustrating an example process for emulating a FMA operation. More specifically, a processor may emulate an FMA operation for operands 60, 62, and 64, where the operation RTE((operand 60*operand 62)+operand 64) is emulated. As shown in FIG. 2, operands 60, 62, and 64 may each be a 32-bit single precision floating point values similar to floating point number 50 shown in FIG. 1, and operands 60, 62, and 64 may respectively include mantissas 66, 68, and 70.

The processor may multiply operands 60 and 62 to produce intermediate value 72, which may also be a floating point value. As discussed above, because operands 60 and 62 may be single precision floating point values, mantissas 66 and 68 may each be 24 bits (a 23-bit mantissa plus a hidden integer bit), and multiplying operands 60 and 62 may include multiplying mantissas 66 and 68 to result in a 48-bit mantissa in intermediate value 72. The processor may normalize the mantissa of intermediate value 72 and may conceptually divide the normalized mantissa of intermediate value 72 into upper portion 74 and lower portion 76. Dividing the normalized mantissa of intermediate value 72 may include dividing the normalized mantissa evenly into two equally-sized halves, so that upper portion 74 includes the upper 24 bits of the mantissa and lower portion 76 includes the lower 24 bits of the mantissa.

The processor may determine upper intermediate value 78 by rounding to zero intermediate value 72 to half the bits of the mantissa of intermediate value 72 (i.e., rounding to zero the 48-bit mantissa to 24 bits). The processor may also determine lower intermediate value 80 by subtracting intermediate value 72 by upper intermediate value 78). Thus, upper intermediate value 78 may include upper portion 74 as its mantissa and lower intermediate value 80 may include lower portion 76 as its mantissa. Note that since intermediate value 72 has been split into upper intermediate value 78 and lower intermediate value 80, the exponent value of lower intermediate value 80 may be smaller by 24 compared to the exponent value of upper intermediate value 78. Furthermore, in some examples, the exponent value of lower intermediate value 80 may be beyond the valid range of exponent values for single precision floating point format.

The processor may determine, based at least in part on the difference between the exponents of operand 64 and intermediate value 72, whether the processor adds operand 64 to upper intermediate value 78 or lower intermediate value 80 to produce resulting upper value 86 or to produce lower value 88. In floating point arithmetic, two floating point values may be added together without shifting either of the two floating point values if the two floating point values have the same exponent. Thus, adding two floating values having different exponents may include shifting the mantissa of one of the floating point values so that the two floating point values have the same exponent, and adding the resulting mantissas. As such, the processor may determine whether to add operand 64 to upper intermediate value 78 or lower intermediate value 80 based at least in part on the amount of shifting required of the mantissa of operand 64 and/or the mantissas of intermediate value 72 so that the exponent of operand 64 matches the exponent of upper intermediate value 78 or lower intermediate value 80.

In some examples, if the processor adds operand 64 to upper intermediate value 78 to result in upper value 86, the processor may set lower value 88 to 0.0. In some other examples, if the processor adds operand 64 to lower intermediate value 80 to result in lower value 88, the processor may set upper value 86 to the value of upper intermediate value 78.

In response to producing upper value 86 and lower value 88, the processor may add upper value 86 to lower value 88. The processor may normalize the sum of upper value 86 and lower value 88 and may round towards nearest even the normalized sum of upper value 86 and lower value 88 to produce resulting value 90 of the emulated FMA operation on operands 62, 64, and 66.

Figure 3:
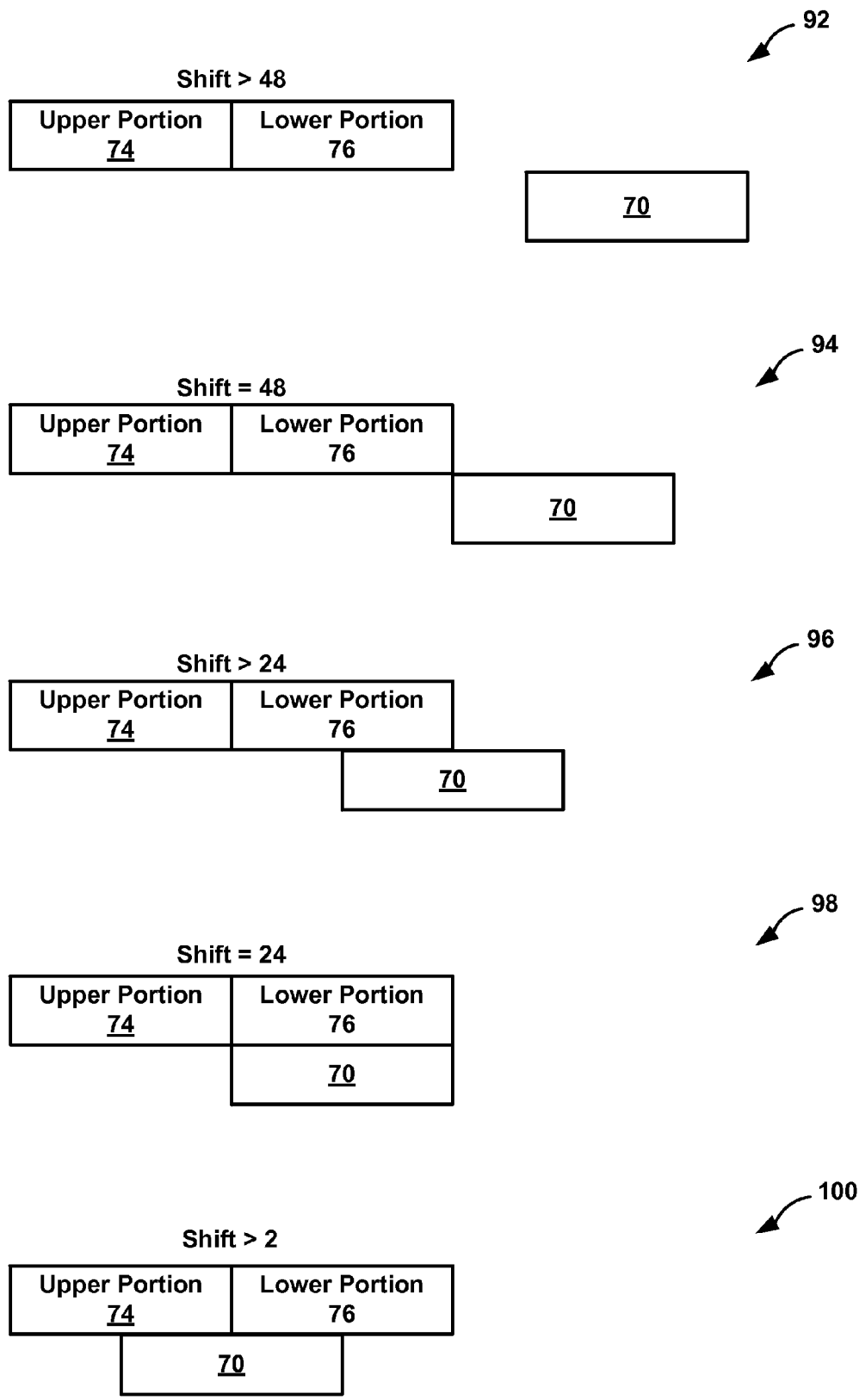
FIG. 3 is a block diagram illustration exemplary scenarios in emulating fused multiply-add operations.

As discussed above, the processor may determine, based at least in part on the difference between the exponents of operand 64 and intermediate value 72, whether the processor adds operand 64 to upper intermediate value 78 or lower intermediate value 80 to produce resulting upper value 86 or lower value 88. FIG. 3 is a block diagram illustrating a situation where the difference between the exponent of intermediate value 72 and the exponent of operand 64 is greater than two, and where the signs of intermediate value 72 and operand 64 are the same. In other words, the exponents of operand 64 is smaller than the exponents of intermediate value 72 by more than 2, so that mantissa 70 of operand 64 may be right shifted by more than two bits and the exponent of operand 64 accordingly incremented by more than two in order for the exponent of operand 64 to equal the exponent of intermediate value 72. Alternatively, the situations shown in FIG. 3 may be expressed as where the unsigned value of operand 64 is less than intermediate value 72 divided by 4.

As shown in FIG. 3, examples of operand 64 where the difference between the exponents of intermediate value 72 and the exponents of operand 64 is greater than 2 may include scenarios 92, 94, 96, 98, and 100. In scenario 92, the exponents of intermediate value 72 and the exponents of operand 64 is greater than 48, so that the processor may shift mantissa 70 rightwards by more than 48 bits to increment the exponent of operand 64 by more than 48 so that the exponent of operand 64 is the same value of the exponent of intermediate value 72.

In scenario 94, the exponents of intermediate value 72 and the exponents of operand 64 is exactly 48, so that the processor may shift mantissa 70 rightwards by exactly 48 bits to increment the exponent of operand 64 by exactly 48 so that the exponent of operand 64 is the same value of the exponent of intermediate value 72. In scenario 96, the exponents of intermediate value 72 and the exponents of operand 64 is greater than 24 and less than 48, so that the processor may shift mantissa 70 rightwards by more than 24 bits and less than 48 to increment the exponent of operand 64 by more than 24 and less than 48 so that the exponent of operand 64 is the same value of the exponent of intermediate value 72.

In scenario 98, the exponents of intermediate value 72 and the exponents of operand 64 is exactly 24, so that the processor may shift mantissa 70 rightwards by exactly 24 bits to increment the exponent of operand 64 by exactly 24 so that the exponent of operand 64 is the same value of the exponent of intermediate value 72. In scenario 100, the exponents of intermediate value 72 and the exponents of operand 64 is greater than 2 and less than 24, so that the processor may shift mantissa 70 rightwards by more than 2 bits and less than 24 bits to increment the exponent of operand 64 by more than 2 and less than 24 so that the exponent of operand 64 is the same value of the exponent of intermediate value 72.

In each of scenarios 92, 94, 96, 98, and 100 shown in FIG. 3, in order to emulate a fused multiply-add operation, the processor may determine whether the signs of intermediate value 72 and operand 64 is the same. Alternatively, the processor may determine whether the signs of intermediate value 72 and operand 64 are the same. In response to determining that the signs of intermediate value 72 and operand 64 is the same, and that either the difference between the exponents of intermediate value 72 and the exponents of operand 64 is greater than 2 or the value of operand 64 is less than intermediate value 72 divided by 4, the processor may set upper value 86 to upper intermediate value 78. The processor may also add operand 64 to lower intermediate value 80, normalize the sum of operand 64 and lower intermediate value 80, and may round to nearest odd the normalized sum of operand 64 and lower intermediate value 80 to produce lower value 88. The processor may add upper value 86 and lower value 88, normalize the sum of upper value 86 and lower value 88, and round to nearest even the normalized sum of upper value 86 and lower value 88 to produce an emulated fused multiply-add result 90.

Similarly, the processor may emulate a fused multiply-subtract operation. A fused multiply-subtract operation may be a fused multiply-addition where the signs of intermediate value 72 and operand 64 are different. In scenarios 92, 94, 96, 98, and 100 the processor may determine if the signs of intermediate value 72 and operand 64 differ. In response to determining that the signs of intermediate value 72 and operand 64 differ, the processor may set upper value 86 to upper intermediate value 78. The processor may also subtract operand 64 from lower intermediate value 80, normalize the difference of lower intermediate value 80 and operand 64, and may round to odd the normalized difference of lower intermediate value 80 and operand 64 to produce lower value 88. The processor may subtract lower value 88 from upper value 86, normalize the difference of upper value 86 and lower value 88, and round to nearest even the normalized sum of upper value 86 and lower value 88 to produce an emulated fused multiply-subtract result 90.

Figure 4:
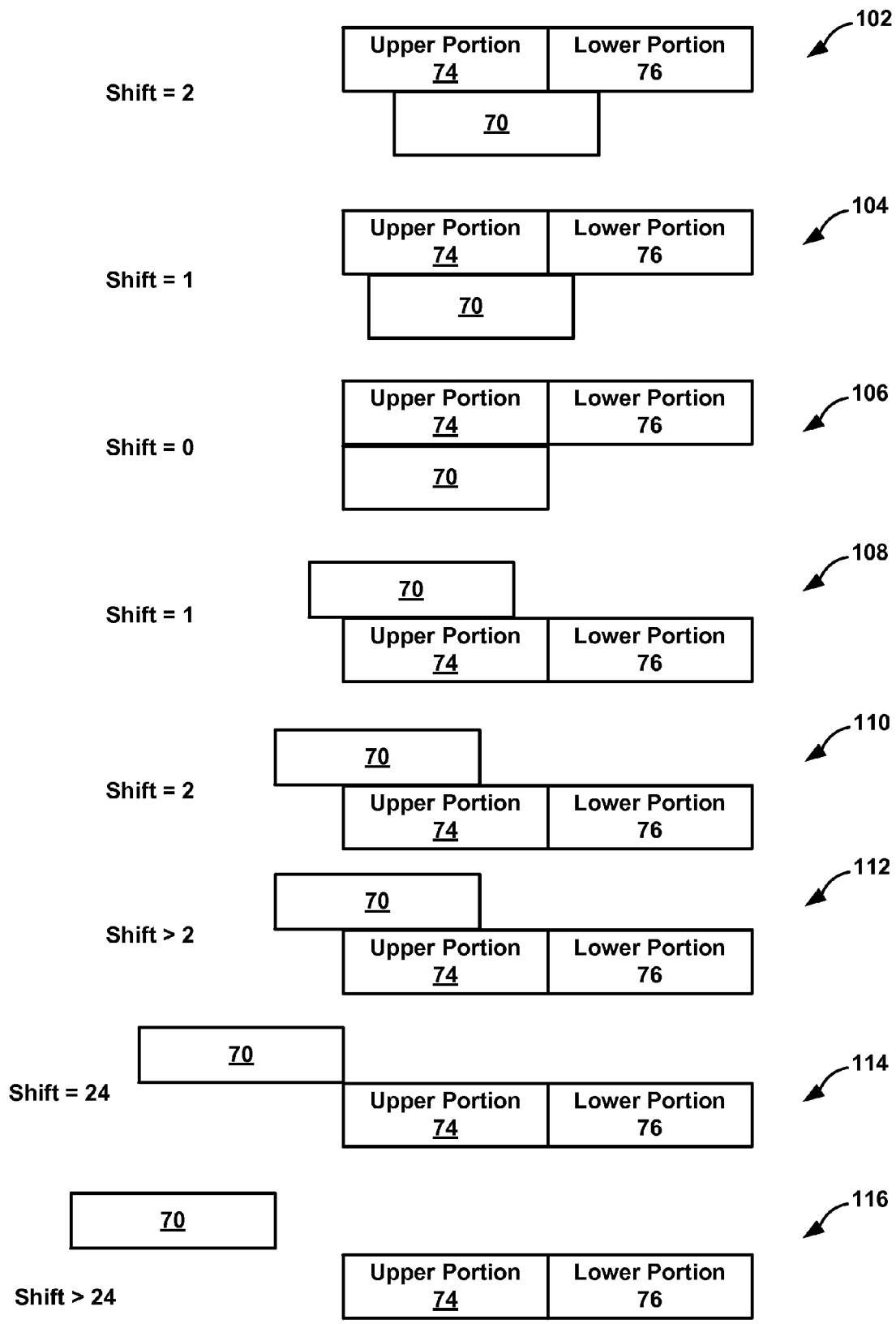
FIG. 4 is a block diagram illustration exemplary scenarios in emulating fused multiply-add operations.

FIG. 4 is a block diagram illustrating a situation where the difference between the exponents of intermediate value 72 and the exponents of operand 64 is less than or equal to two, or if the exponent of operand 64 is greater than or equal to the exponent of intermediate value 72, and where the signs of intermediate value 72 and operand 64 are the same. In other words, the exponents of operand 64 is smaller than the exponents of intermediate value 72 by 2 or less, or the exponent of operand 64 is greater than the exponent of intermediate value 72. Mantissa 70 of operand 64 may be right shifted two times or less and the exponent of operand 64 accordingly incremented by no more than two in order for the exponent of operand 64 to equal the exponent of intermediate value 72. Alternatively, the situations shown in FIG. 4 may be expressed as where the unsigned value of operand 64 is greater than or equal to intermediate value 72 divided by 4.

As shown in FIG. 4, examples of operand 64 where the difference between the exponents of intermediate value 72 and the exponents of operand 64 is less than or equal to 2 may include scenarios 102, 104, 106, 108, 110, 112, 114 and 116. In scenario 102, the exponents of intermediate value 72 and the exponents of operand 64 is exactly 2, so that the processor may shift mantissa 70 rightwards by 2 bits to increment the exponent of operand 64 by exactly 2 so that the exponent of operand 64 is the same value of the exponent of intermediate value 72.

In scenario 104, the exponents of intermediate value 72 and the exponents of operand 64 is exactly 1, so that the processor may shift mantissa 70 rightwards by 1 bit to increment the exponent of operand 64 by exactly 1 so that the exponent of operand 64 is the same value of the exponent of intermediate value 72.

In scenario 106, the exponent of intermediate value 72 is the same as the exponents of operand 64, so that the processor does not need to shift mantissa 70. In scenario 108, the exponents of operand 64 is larger than the exponent of intermediate value 72 by exactly 1, so that the processor may shift the mantissa of intermediate value 72 rightwards by exactly 1 bit to increment the exponent of intermediate value 72 by exactly 1 so that the exponent of operand 64 is the same value of the exponent of intermediate value 72. In scenario 110, the exponents of operand 64 is larger than the exponent of intermediate value 72 by 2, so that the processor may shift the mantissa of intermediate value 72 rightwards by exactly 2 bits to increment the exponent of intermediate value 72 by exactly 2 so that the exponent of operand 64 is the same value of the exponent of intermediate value 72.

In scenario 112, the exponents of operand 64 is greater than the exponent of intermediate value 72 by more than 2 and less than 24, so that the processor may shift the mantissa of intermediate value 72 rightwards by more than 2 and less than 24 bits to increment the exponent of intermediate value 72 by more than 2 and less than 24 so that the exponent of operand 64 is the same value of the exponent of intermediate value 72. In scenario 114, the exponents of operand 64 is larger than the exponent of intermediate value 72 by exactly 24, so that the processor may shift the mantissa of intermediate value 72 rightwards by exactly 24 bits to increment the exponent of intermediate value 72 by exactly 24 so that the exponent of operand 64 is the same value of the exponent of intermediate value 72.

In scenario 116, the exponents of operand 64 is greater than the exponent of intermediate value 72 by more 24, so that the processor may shift the mantissa of intermediate value 72 rightwards by more than 24 bits to increment the exponent of intermediate value 72 by more than 24 so that the exponent of operand 64 is the same value of the exponent of intermediate value 72.

In each of scenarios 102, 104, 106, 108, 110, 112, 114, and 116 shown in FIG. 4, in order to emulate a fused multiply-add operation, the processor may determine whether the signs of intermediate value 72 and operand 64 are the same. The processor may also determine whether the exponent of operand 64 is greater than, the same, or smaller than by no more two the exponent of intermediate value 72. In response to determining that the signs of intermediate value 72 and operand 64 is the same and in further response to determining that the exponent of operand 64 is greater than, the same, or smaller than by no more two the exponent of intermediate value 72, the processor may set lower value 88 to 0.0 If operand 64 and intermediate value 72 have the same sign for scenarios 102, 104, 106, 108, 110, 112, 114, and 116 shown in FIG. 4, the processor may set lower value 88 to 0.0 regardless of the exponents of operand 64 and intermediate value 72. The processor may also add operand 64 to upper intermediate value 78, normalize the sum of operand 64 and upper intermediate value 78, and may round to nearest even the normalized sum of operand 64 and upper intermediate value 78 to produce upper value 86. In this example, the multiply stage of the processor sends upper portion 74 and the MSB, the second MSB as well as OR of the remaining bits of lower portion 76, to form guard bit 73, round bit 75, and sticky bit 77, respectively. The processor may add upper value 86 and lower value 88, normalize the sum of upper value 86 and lower value 88, and round to nearest even the normalized sum of upper value 86 and lower value 88 to produce an emulated fused multiply-add result 90.

Similarly, in scenarios 102, 104, 106, 108, 110, 112, 114, and 116 shown in FIG. 4, the processor may emulate a fused multiply-subtract operation. As discussed above, a fused multiply-subtract operation may be a fused multiply-addition where the signs of intermediate value 72 and operand 64 are different. In scenarios 102, 110, 112, 114, and 116, the processor may set lower value 88 to 0.0. In scenarios 104, 106, and 108, GPU may set lower value 88 to the lower 22 bits (i.e., [21:0]) of lower portion 76.

For scenarios 102, 104, 106, the processor may add operand 64 and upper intermediate value 78, normalize the sum of upper intermediate value 78 and operand 64, and may round to nearest even the normalized sum of upper intermediate value 78 and operand 64 to produce upper value 86 As mentioned above, the rounding to produce upper value 86 may be based at least in part on the guard, round, and sticky bits resulting from the multiply stage. The processor may add upper value 86 and lower value 88, normalize the sum of upper value 86 and lower value 88, and round to nearest even the normalized sum of upper value 86 and lower value 88 to produce an emulated fused multiply-add result 90.

For scenarios 108, 110, 112, 114, and 116 when signs of operand 64 and intermediate value 72 are different, the processor may sum-upper intermediate value 78 having guard, round, and sticky bits from lower intermediate value 80 with operand 64, normalize the sum of operand 64 and upper intermediate value 78, and may round to nearest even the normalized sum of operand 64 and upper intermediate value 78 to produce upper value 86. The processor may add upper value 86 and lower value 88, normalize the sum of upper value 86 and lower value 88, and round to nearest even the normalized sum of upper value 86 and lower value 88 to produce an emulated fused multiply-add result 90.

In each of the scenarios 102, 104, 106, 108, 110, 112, 114, and 116 shown in FIG. 4, the processor may also preserve guard bit 73, round bit 75, and sticky bit 77 from normalizing the product of operands 60 and 62 to produce intermediate value 72, so that the result of rounding to nearest even the normalized sum or difference of operand 64 and upper intermediate value 78 to produce upper value 86 may be based at least in part on one or more of the values of one or more guard bit 73, round bit 75, and sticky bit 77 from normalizing the product of operands 60 and 62. For example, in scenarios 102, 104, and 106, rounding to nearest even the normalized sum or difference of operand 64 and upper intermediate value 78 to produce upper value 86 may be based on guard bit 73, round bit 75, and sticky bit 77 from normalizing the product of operands 60 and 62 acting as the guard bit, the round bit, and the sticky bit, respectively, for upper intermediate value 78.

In scenario 108, the value of guard bit 73 from normalizing the product of operands 60 and 62 may be the round bit, and the result from ORing round bit 75 from normalizing the product of operands 60 and 62 with sticky bit 77 from normalizing the product of operands 60 and 62 may act as the sticky bit. LSB of 73 becomes the guard bit. The processor may round to nearest even the normalized sum or difference of operand 64 and upper intermediate value 78 to produce upper value 86 based on these guard, round and sticky bits.

In scenarios 110, 112, 114, and 116, the result from ORing guard bit 73 from normalizing the product of operands 60 and 62 with round bit 75 from normalizing the product of operands 60 and 62 with sticky bit 77 from normalizing the product of operands 60 and 62 may act as the sticky bit. The processor may round to nearest even the normalized sum of operand 64 and upper intermediate value 78 to produce upper value 86 based on the guard, round and sticky bits.

Table 2 summarizes scenarios 92-116 for both emulated fused multiply-addition and emulated fused multiply-subtraction:

TABLE 2

| | Upper Value | | | | Lower Value | | | |
|---|---|---|---|---|---|---|---|---|
| Scenario | ADD | RND | SUB | RND | ADD | RND | SUB | RND |
| 92 | uh | RTZ | uh | RTZ | ul + c | RTO | ul − c | RTO |
| 94 | uh | RTZ | uh | RTZ | ul + c | RTO | ul − c | RTO |
| 96 | uh | RTZ | uh | RTZ | ul + c | RTO | ul − c | RTO |
| 98 | uh | RTZ | uh | RTZ | ul + c | RTO | ul − c | RTO |
| 100 | uh | RTZ | uh | RTZ | ul + c | RTO | ul − c | RTO |
| 102 | (uh{ul(grs)) + c | RTE | (uh{ul(grs)) − c | RTE | 0.0 | | 0.0 | RTO |
| 104 | (uh{ul(grs)) + c | RTE | (uh{ul(grs)) − c | RTE | 0.0 | | ul[21:0] | |
| 106 | (uh{ul(grs)) + c | RTE | (uh{ul(grs)) − c | RTE | 0.0 | | ul[21:0] | |
| 108 | c + (uh{g{(r|s)) | RTE | c − (uh{g{(r|s)) | RTE | 0.0 | | ul[21:0] | |

TABLE 2-continued

| | Upper Value | | | | Lower Value | | | |
|---|---|---|---|---|---|---|---|---|
| Scenario | ADD | RND | SUB | RND | ADD | RND | SUB | RND |
| 110 | c + (uh\|(g\|r\|s)) | RTE | c − (uh\|(g\|r\|s)) | RTE | 0.0 | | 0.0 | |
| 112 | c + (uh\|(g\|r\|s)) | RTE | c − (uh\|(g\|r\|s)) | RTE | 0.0 | | 0.0 | |
| 114 | c + (uh\|(g\|r\|s)) | RTE | c − (uh\|(g\|r\|s)) | RTE | 0.0 | | 0.0 | |
| 116 | c + (uh\|(g\|r\|s)) | RTE | c − (uh\|(g\|r\|s)) | RTE | 0.0 | | 0.0 | |

As shown in Table 2, the scenarios listed correspond to scenarios 92-116 shown in FIGS. 3 and 4. Upper Value may represent upper value 86 and lower value may represent lower value 88 "uh" may represent upper intermediate value 78, "ul" may represent lower intermediate value 80, and "c" may represent operand 64. The ADD columns may represent the values of upper value 86 and/or lower value 88 for fused multiply-add, and the SUB columns may represent the values of upper value 86 and/or lower value 88 for fused multiply-subtract. The "{" symbol may represent concatenation of one or more bits and the "|" symbol may represent logical OR of one or more bits. "g", "r", and "s" may represent guard bit 73, round bit 75, and sticky bit 77, respectively, resulting from normalizing intermediate value 72 that comes from the most significant bits of lower portion 76.

For scenario 96, if ul−c results in a negative value, processor may represent the resulting negative value in twos complement form because a multiplier of the processor may not be able to normalize the resulting negative value. For scenarios 104 and 106, the resulting value of (uh {ul(grs))−c may be so small that the resulting value may be represented as denormal numbers. For example, the resulting value may have an exponent value of −127 that becomes −126 after a rounding step.

For scenarios 110, 112, 114, and 116, uh may be shifted right 2 or more bits. Bit 1 of the shifted value acts as round bit 75. Bit 0 of the shifted value may be ORed with the result of (g|r|s) to form sticky bit 77. Thus, in scenarios 110, 112, 114, and 116, uh|(g|r|s) may stand for ORing the result of ORing guard bit 73, round bit 75, and sticky bit 77 with the LSB of uh to form sticky bit 77.

Figure 5:
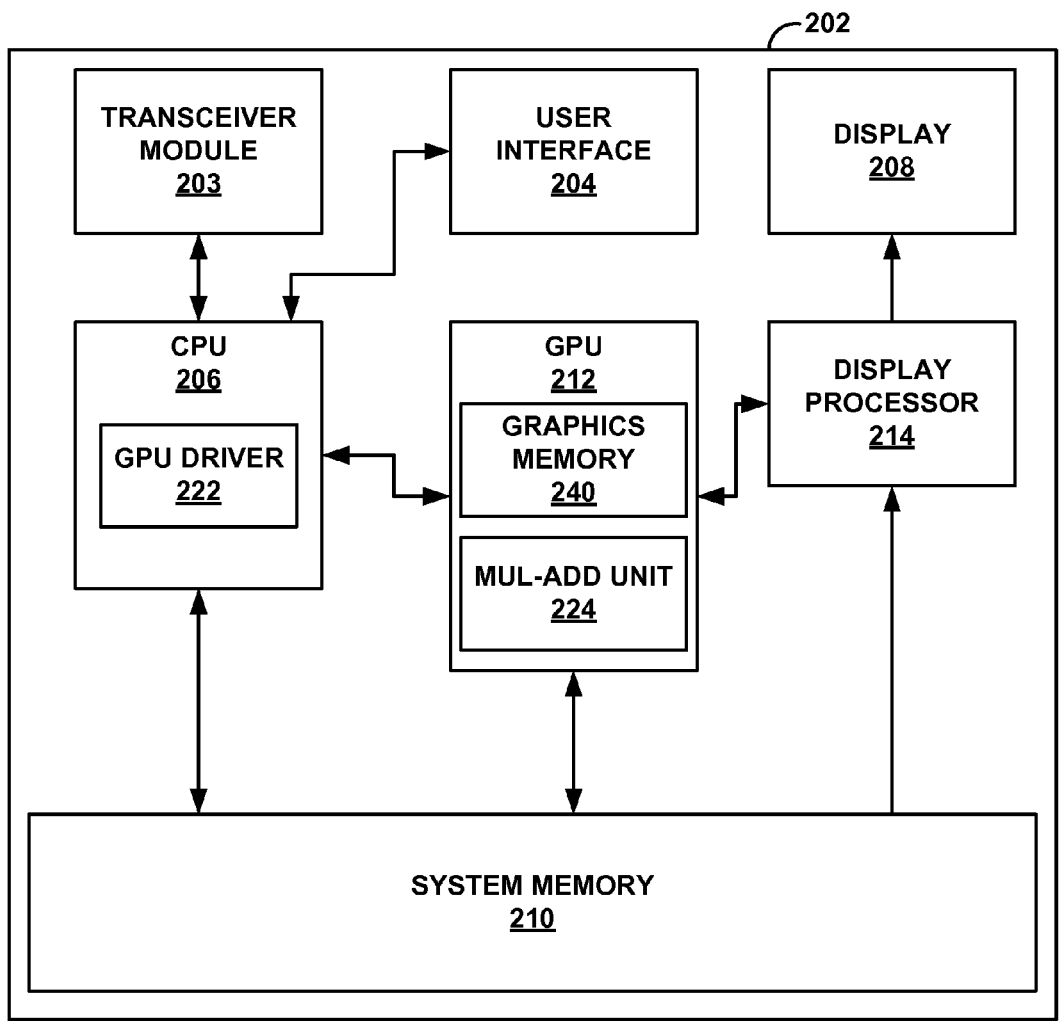
FIG. 5 is a block diagram illustrating an example computing device that may be configured to implement one or more aspects of this disclosure.

FIG. 5 is a block diagram illustrating an example computing device that may be configured to implement one or more aspects of this disclosure. As shown in FIG. 5, computing device 202 may be a computing device including but not limited to video devices, media players, set-top boxes, wireless handsets such as mobile telephones and so-called smartphones, personal digital assistants (PDAs), desktop computers, laptop computers, gaming consoles, video conferencing units, tablet computing devices, and the like. In the example of FIG. 5, computing device 202 may include central processing unit (CPU) 206, system memory 210, and GPU 212. Computing device 202 may also include display processor 214, transceiver module 203, user interface 204, and display 208. Transceiver module 203 and display processor 214 may both be part of the same integrated circuit (IC) as CPU 206 and/or GPU 212, may both be external to the IC or ICs that include CPU 206 and/or GPU 212, or may be formed in the IC that is external to the IC that includes CPU 206 and/or GPU 212.

Computing device 202 may include additional modules or units not shown in FIG. 5 for purposes of clarity. For example, computing device 202 may include a speaker and a microphone, neither of which are shown in FIG. 5, to effectuate telephonic communications in examples where computing device 202 is a mobile wireless telephone, or a speaker where computing device 202 is a media player. Computing device 220 may also include a video camera. Furthermore, the various modules and units shown in computing device 202 may not be necessary in every example of computing device 202. For example, user interface 204 and display 208 may be external to computing device 202 in examples where computing device 202 is a desktop computer or other device that is equipped to interface with an external user interface or display.

Examples of user interface 204 include, but are not limited to, a trackball, a mouse, a keyboard, and other types of input devices. User interface 204 may also be a touch screen and may be incorporated as a part of display 208. Transceiver module 203 may include circuitry to allow wireless or wired communication between computing device 202 and another device or a network. Transceiver module 203 may include modulators, demodulators, amplifiers and other such circuitry for wired or wireless communication.

Processor 206 may be a microprocessor, such as a central processing unit (CPU) configured to process instructions of a computer program for execution. Processor 206 may comprise a general-purpose or a special-purpose processor that controls operation of computing device 202. A user may provide input to computing device 202 to cause processor 206 to execute one or more software applications. The software applications that execute on processor 206 may include, for example, an operating system, a word processor application, an email application, a spreadsheet application, a media player application, a video game application, a graphical user interface application or another program. Additionally, processor 206 may execute GPU driver 222 for controlling the operation of GPU 212. The user may provide input to computing device 202 via one or more input devices (not shown) such as a keyboard, a mouse, a microphone, a touch pad or another input device that is coupled to computing device 202 via user input interface 204. Processor 206 may be configured to perform any of the techniques disclosed herein for emulating FMA operations.

The software applications that execute on processor 206 may include one or more graphics rendering instructions that instruct processor 206 to cause the rendering of graphics data to display 208. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In other examples, the software instructions may conform to other APIs, such as an Open Computing Language (OpenCL) API. In order to process the graphics rendering instructions, processor 206 may issue one or more graphics rendering commands to GPU 212 (e.g., through GPU driver 222) to cause GPU 212 to perform some or all of the rendering of the graphics data.

In some examples, the graphics data to be rendered may include a list of graphics primitives, e.g., points, lines, triangles, quadrilaterals, triangle strips, etc. Typically a mathematics function library may be provided by the compiler for functions such as arcsin, arctan, power, and the like. These functions may be implemented using a rational polynomial. Using FMA instructions for such library function implementations may potentially provide higher precision and execution speed.

GPU 212 may be configured to perform graphics operations to render one or more graphics primitives to display 208. Thus, when one of the software applications executing on processor 206 requires graphics processing, processor 206 may provide graphics commands and graphics data to GPU 212 for rendering to display 208. The graphics data may include, e.g., drawing commands, state information, primitive information, texture information, etc. GPU 212 may, in some instances, be built with a highly-parallel structure that provides more efficient processing of complex graphic-related operations than processor 206. For example, GPU 212 may include a plurality of processing elements, such as shader units, that are configured to operate on multiple vertices or pixels in a parallel manner. The highly parallel nature of GPU 212 may, in some instances, allow GPU 212 to draw graphics images (e.g., GUIs and two-dimensional (2D) and/or three-dimensional (3D) graphics scenes) onto display 208 more quickly than drawing the scenes directly to display 208 using processor 206.

GPU 212 may, in some instances, be integrated into a motherboard of computing device 202. In other instances, GPU 212 may be present on a graphics card that is installed in a port in the motherboard of computing device 202 or may be otherwise incorporated within a peripheral device configured to interoperate with computing device 202. GPU 212 may include one or more processors, such as one or more microprocessors, application specific integrated circuits (ASICs), field programmable gate arrays (FPGAs), digital signal processors (DSPs), or other equivalent integrated or discrete logic circuitry. GPU 212 may also include one or more processor cores, so that GPU 212 may be referred to as a multi-core processor. GPU 212 may be configured to perform any of the techniques disclosed herein for emulating FMA operations.

GPU 212 may be directly coupled to graphics memory 240. Thus, GPU 212 may read data from and write data to graphics memory 240 without using a bus. In other words, GPU 212 may process data locally using a local storage, instead of off-chip memory. Such graphics memory 240 may be referred to as on-chip memory. This allows GPU 212 to operate in a more efficient manner by eliminating the need of GPU 212 to read and write data via a bus, which may experience heavy bus traffic. In some instances, however, GPU 212 may not include a separate memory, but instead utilize system memory 210 via a bus. Graphics memory 240 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

In some examples, GPU 212 may store a fully formed image in system memory 210. Display processor 214 may retrieve the image from system memory 210 and output values that cause the pixels of display 208 to illuminate to display the image. Display 208 may the display of computing device 202 that displays the image content generated by GPU 212. Display 208 may be a liquid crystal display (LCD), an organic light emitting diode display (OLED), a cathode ray tube (CRT) display, a plasma display, or another type of display device.

GPU 212 may include MUL-ADD unit 224, which may be a digital circuit that is configured to perform unfused multiply-add operations. MUL-ADD unit 224 may include digital circuits, hardware multipliers, adders, hardware logic, and the like to perform floating point arithmetic and logical operations necessary to perform unfused multiply-add operations. GPU 212 may utilize MUL-ADD unit 224 to emulate FMA operations. GPU 212 may also include additional hardware such as hardware for performing rounding, shifting, and normalization of floating point numbers to assist MUL-ADD unit 224 to emulate FMA operations. In some examples, processor 206 may also include MUL-ADD unit 224 and additional hardware that together may be configured to emulate FMA operations according to the techniques disclosed herein.

In some examples, processor 206 or GPU 212 using at least MUL-ADD unit 224 may be configured to emulate an FMA operation for a first operand, a second operand, and a third operand. To emulate the FMA operation, processor 206 or GPU 212 may determine an intermediate value based at least in part on multiplying the first operand with the second operand; determine at least one of an upper intermediate value or a lower intermediate value, wherein determining the upper intermediate value comprises rounding, towards zero, the intermediate value by a specified number of bits, and wherein determining the lower intermediate value comprises subtracting the intermediate value by the upper intermediate value; determine an upper value and a lower value based at least in part on adding the third operand to one of the upper intermediate value or the lower intermediate value; and determine an emulated fused multiply-add result for the first operand, the second operand, and the third operand by adding the upper value and the lower value.

Figure 6:
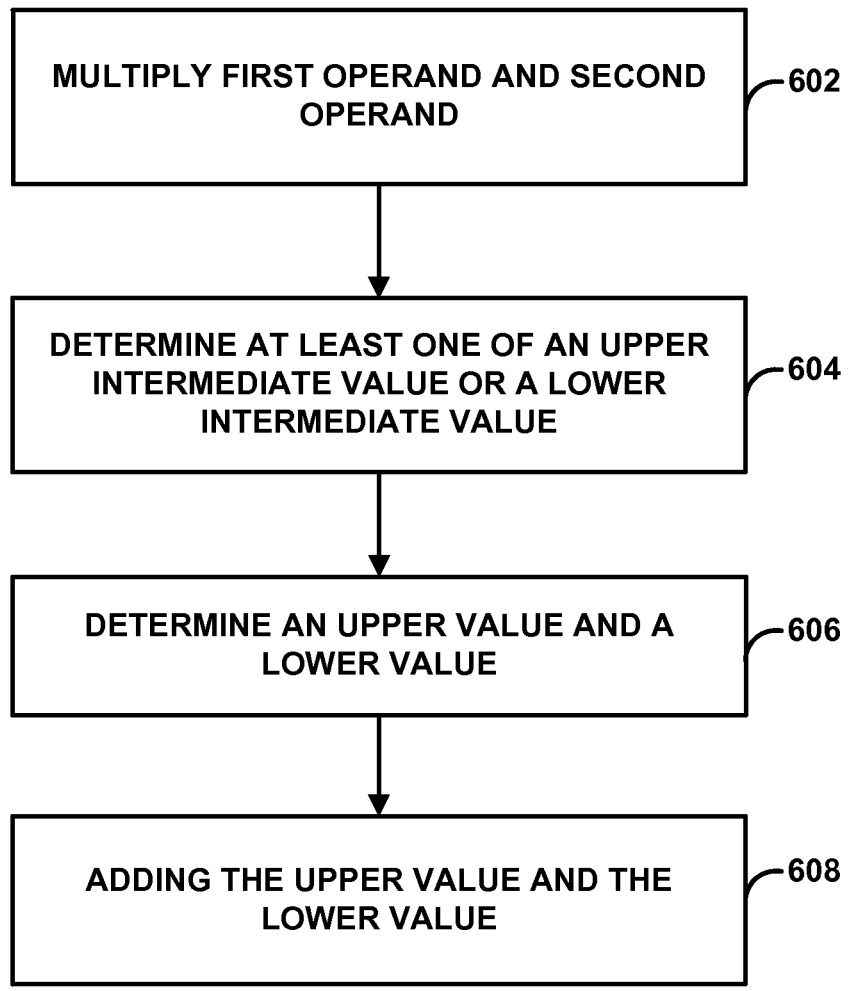
FIG. 6 is a flowchart illustrating an example process for emulating fused multiply-add operations.

FIG. 6 is a flowchart illustrating an example process for emulating an FMA operation. As shown in FIG. 6, the process may include determining, by processor 206 or GPU 212, an intermediate value based at least in part on multiplying a first operand with a second operand (602).

In some examples, the first operand, the second operand, and the third operand may comprise 32-bit floating point numbers, a mantissa of the intermediate value may comprise 48 bits, and the specified number of bits may comprise 24 bits.

The process may further include determining, by processor 206 or GPU 212, at least one of an upper intermediate value or a lower intermediate value, wherein determining the upper intermediate value may comprise rounding, towards zero, the intermediate value by a specified number of bits, and wherein determining the lower intermediate value may comprise subtracting the intermediate value by the upper intermediate value (604). In some examples, determining at least one of an upper intermediate value or a lower intermediate value may further include determining the upper intermediate value and, in response to an exponent of the intermediate value being greater than an exponent of the third operand by more than a specified threshold, determining the lower intermediate value.

The process may further include determining, by processor 206 or GPU 212, an upper value and a lower value based at least in part on adding a third operand to one of the upper intermediate value or the lower intermediate value (606).

In some examples, determining, by processor 206 or GPU 212, an upper value and a lower value based at least in part on adding the third operand to one of the upper intermediate value or the lower intermediate value may include in response to a sign of the intermediate value being the same as a sign of the third operand, and in response to an exponent of the intermediate value being greater than an exponent of the third operand by more than a specified threshold: setting, by processor 206 or GPU 212, the upper value to the upper intermediate value and determining, by processor 206 or GPU 212, the lower value by rounding to nearest odd a sum of the lower intermediate value and the third operand. In some examples, the specified threshold may be 2 because cancellation may happen when the exponent difference is 1 or 0.

In some examples, determining, by processor 206 or GPU 212, an upper value and a lower value based at least in part on adding the third operand to one of the upper intermediate value or the lower intermediate value may include in response to a sign of the intermediate value being the same as a sign of the third operand, and in response to an exponent of the intermediate value being greater than an exponent of the third operand by fewer than a specified threshold or the exponent of the intermediate value being equal to or less than the exponent of the third operand: determining, by processor 206 or GPU 212, the upper value by rounding to nearest even a sum of the upper intermediate value and the third operand, and setting, by processor 206 or GPU 212, the lower value to 0.0. In some examples, the specified threshold may be 2. In some examples, determining the intermediate value may include normalizing, by processor 206 or GPU 212, a product of the first operand and the second operand, and rounding to nearest even the sum of the upper intermediate value and the third operand may include rounding, by processor 206 or GPU 212, to nearest even the sum of the upper intermediate value and the third operand based at least in part on one or more of a guard bit, a round bit, and a sticky bit resulting from normalizing the intermediate value.

In some examples, determining the upper value and the lower value based at least in part on adding the third operand to one of the upper intermediate value or the lower intermediate value may include in response to a sign of the product being different from a sign of the third operand, and in response to an exponent of the intermediate value being greater than an exponent of the third operand by a specified threshold: setting, by processor 206 or GPU 212, the upper value to the upper intermediate value, and determining, by processor 206 or GPU 212, the lower value by rounding to nearest odd a sum of the lower intermediate value and the third operand.

The process may further include determining, by processor 206 or GPU 212, an emulated fused multiply-add result for the first operand, the second operand, and the third operand by adding the upper value and the lower value (608).

In some examples, determining an emulated fused multiply-add result for the first operand, the second operand, and the third operand may further include normalizing, by processor 206 or GPU 212, a sum of the upper value and the lower value, and rounding, by processor 206 or GPU 212, to even the normalized sum of the upper value and the lower value.

Although the present disclosure discusses techniques for emulating an FMA operation for single precision floating point numbers, it should be understood that the techniques discussed herein may be equally applicable to half precision floating point numbers, double precision floating point numbers, any other sized floating point numbers, as well as floating point numbers represented in any other applicable floating point format.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" and "processing unit," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method for emulating a fused multiply-add operation for a first operand, a second operand, and a third operand, the method comprising:

determining, by at least one processor, an intermediate value based at least in part on multiplying the first operand with the second operand;

determining, by the at least one processor, at least one of an upper intermediate value or a lower intermediate value, wherein determining the upper intermediate value comprises rounding, towards zero, the intermediate value by a specified number of bits, and wherein determining the lower intermediate value comprises subtracting the intermediate value by the upper intermediate value;

determining, by the at least one processor, an upper value and a lower value, including adding the third operand to one of the upper intermediate value or the lower intermediate value based at least in part on a difference between exponents of the third operand and the intermediate value; and determining, by the at least one processor, an emulated fused multiply-add result for the first operand, the second operand, and the third operand by adding the upper value and the lower value.

2. The method of claim 1, wherein determining, by the at least one processor, an upper value and a lower value based at least in part on adding a third operand to one of the upper intermediate value or the lower intermediate value comprises:

in response to a sign of the intermediate value being the same as a sign of the third operand, and in response to an exponent of the intermediate value being greater than an exponent of the third operand by more than a specified threshold:

setting, by the at least one processor, the upper value to the upper intermediate value, and determining, by the at least one processor, the lower value by rounding to nearest odd a sum of the lower intermediate value and the third operand.

3. The method of claim 2, wherein the specified threshold is 2.

4. The method of claim 1, wherein determining, by the at least one processor, an upper value and a lower value based at least in part on adding a third operand to one of the upper intermediate value or the lower intermediate value comprises:

in response to a sign of the intermediate value being the same as a sign of the third operand, and in response to an exponent of the intermediate value being greater than an exponent of the third operand by fewer than a specified threshold or the exponent of the intermediate value being equal to or less than the exponent of the third operand:

determining, by the at least one processor, the upper value by rounding to nearest even a sum of the upper intermediate value and the third operand, and setting, by the at least one processor, the lower value to 0.0.

5. The method of claim 4, wherein the specified threshold is 2.

6. The method of claim 4, wherein:

determining the intermediate value comprises normalizing, by the at least one processor, a product of the first operand and the second operand; and rounding to nearest even the sum of the upper intermediate value and the third operand comprises rounding, by the at least one processor, to nearest even the sum of the upper intermediate value and the third operand based at least in part on one or more of a guard bit, a round bit, and a sticky bit resulting from normalizing the intermediate value.

7. The method of claim 1, wherein determining the upper value and the lower value based at least in part on adding a third operand to one of the upper intermediate value or the lower intermediate value comprises:

in response to a sign of the product being different from a sign of the third operand, and in response to an exponent of the intermediate value being greater than an exponent of the third operand by a specified threshold:

setting, by the at least one processor, the upper value to the upper intermediate value, and determining, by the at least one processor, the lower value by rounding to nearest odd a sum of the lower intermediate value and the third operand.

8. The method of claim 1, wherein determining an emulated fused multiply-add result for the first operand, the second operand, and the third operand further comprises:

normalizing, by the at least one processor, a sum of the upper value and the lower value; and rounding, by the at least one processor, to even the normalized sum of the upper value and the lower value.

9. The method of claim 1, wherein:

the first operand, the second operand, and the third operand comprise 32-bit floating point numbers;

a mantissa of the intermediate value comprises 48 bits; and the specified number of bits comprises 24 bits.

10. The method of claim 1, wherein determining at least one of an upper intermediate value or a lower intermediate value further comprises:

determining the upper intermediate value; and in response to an exponent of the intermediate value being greater than an exponent of the third operand by more than a specified threshold, determining the lower intermediate value.

11. An apparatus for emulating a fused multiply-add operation for a first operand, a second operand, and a third operand, the apparatus comprising:

a memory configured to store the first operand, the second operand, and the third operand; and at least one processor configured to:

determine an intermediate value based at least in part on multiplying the first operand with the second operand;

determine at least one of an upper intermediate value or a lower intermediate value, wherein determining the upper intermediate value comprises rounding, towards zero, the intermediate value by a specified number of bits, and wherein determining the lower intermediate value comprises subtracting the intermediate value by the upper intermediate value;

determine an upper value and a lower value, including adding the third operand to one of the upper intermediate value or the lower intermediate value based at least in part on a difference between exponents of the third operand and the intermediate value; and determine an emulated fused multiply-add result for the first operand, the second operand, and the third operand by adding the upper value and the lower value.

12. The apparatus of claim 11, wherein the at least one processor is further configured to:

in response to a sign of the intermediate value being the same as a sign of the third operand, and in response to an exponent of the intermediate value being greater than an exponent of the third operand by more than a specified threshold:
  setting the upper value to the upper intermediate value, and
  determine the lower value by rounding to nearest odd a sum of the lower intermediate value and the third operand.

13. The apparatus of claim 11, wherein:
the specified threshold is 2.

14. The apparatus of claim 11, wherein the at least one processor is further configured to:
  in response to a sign of the intermediate value being the same as a sign of the third operand, and in response to an exponent of the intermediate value being greater than an exponent of the third operand by fewer than a specified threshold or the exponent of the intermediate value being equal to or less than the exponent of the third operand:
    determine the upper value by rounding to nearest even a sum of the upper intermediate value and the third operand, and
    set the lower value to 0.0.

15. The apparatus of claim 14, wherein the specified threshold is 2.

16. The apparatus of claim 14, wherein the at least one processor is further configured to:
  normalize a product of the first operand and the second operand; and
  round to nearest even the sum of the upper intermediate value and the third operand based at least in part on one or more of a guard bit, a round bit, and a sticky bit resulting from normalizing the intermediate value.

17. The apparatus of claim 11, wherein the at least one processor is further configured to:
  in response to a sign of the product being different from a sign of the third operand, and in response to an exponent of the intermediate value being greater than an exponent of the third operand by a specified threshold:
    setting the upper value to the upper intermediate value, and
    determine the lower value by rounding to nearest odd a sum of the lower intermediate value and the third operand.

18. The apparatus of claim 11, wherein the at least one processor is further configured to:
  normalize a sum of the upper value and the lower value; and
  round to even the normalized sum of the upper value and the lower value.

19. The apparatus of claim 11, wherein:
  the first operand, the second operand, and the third operand comprise 32-bit floating point numbers;
  a mantissa of the intermediate value comprises 48 bits; and
  the specified number of bits comprises 24 bits.

20. The apparatus of claim 11, wherein the at least one processor is further configured to:
  determine the upper intermediate value; and
  in response to an exponent of the intermediate value being greater than an exponent of the third operand by more than a specified threshold, determine the lower intermediate value.

21. An apparatus for emulating a fused multiply-add operation for a first operand, a second operand, and a third operand, the apparatus comprising:
  means for determining, by at least one processor, an intermediate value based at least in part on multiplying the first operand with the second operand;
  means for determining, by the at least one processor, at least one of an upper intermediate value or a lower intermediate value, wherein the means for determining the upper intermediate value comprises means for rounding, towards zero, the intermediate value by a specified number of bits, and wherein the means for determining the lower intermediate value comprises means for subtracting the intermediate value by the upper intermediate value;
  means for determining, by the at least one processor, an upper value and a lower value, including adding the third operand to one of the upper intermediate value or the lower intermediate value based at least in part on a difference between exponents of the third operand and the intermediate value; and
  means for determining, by the at least one processor, an emulated fused multiply-add result for the first operand, the second operand, and the third operand by adding the upper value and the lower value.

22. The apparatus of claim 21, wherein the means for determining, by the at least one processor, an upper value and a lower value based at least in part on adding a third operand to one of the upper intermediate value or the lower intermediate value comprises:
  means for, in response to a sign of the intermediate value being the same as a sign of the third operand, and in response to an exponent of the intermediate value being greater than an exponent of the third operand by more than a specified threshold:
    setting the upper value to the upper intermediate value, and
    determining the lower value by rounding to nearest odd a sum of the lower intermediate value and the third operand.

23. The apparatus of claim 21, wherein the means for determining, by the at least one processor, an upper value and a lower value based at least in part on adding the third operand to one of the upper intermediate value or the lower intermediate value comprises:
  means for, in response to a sign of the intermediate value being the same as a sign of the third operand, and in response to an exponent of the intermediate value being greater than an exponent of the third operand by fewer than a specified threshold or the exponent of the intermediate value being equal to or less than the exponent of the third operand:
    determining the upper value by rounding to nearest even a sum of the upper intermediate value and the third operand, and
    setting the lower value to 0.0.

24. The apparatus of claim 21, wherein the means for determining the upper value and the lower value based at least in part on adding the third operand to one of the upper intermediate value or the lower intermediate value comprises:
  means for, in response to a sign of the product being different from a sign of the third operand, and in response to an exponent of the intermediate value being greater than an exponent of the third operand by a specified threshold:
    setting the upper value to the upper intermediate value, and determining the lower value by rounding to nearest odd a sum of the lower intermediate value and the third operand.

25. The apparatus of claim 21, wherein the means for determining an emulated fused multiply-add result for the first operand, the second operand, and the third operand further comprises:
   means for normalizing a sum of the upper value and the lower value; and
   means for rounding to even the normalized sum of the upper value and the lower value.

26. A non-transitory computer-readable storage medium storing instructions that, when executed, cause one or more programmable processors to:
   determine an intermediate value based at least in part on multiplying a first operand with a second operand;
   determine at least one of an upper intermediate value or a lower intermediate value, wherein determining the upper intermediate value comprises rounding, towards zero, the intermediate value by a specified number of bits, and wherein determining the lower intermediate value comprises subtracting the intermediate value by the upper intermediate value;
   determine an upper value and a lower value, including adding a third operand to one of the upper intermediate value or the lower intermediate value based at least in part on a difference between exponents of the third operand and the intermediate value; and
   determine an emulated fused multiply-add result for the first operand, the second operand, and the third operand by adding the upper value and the lower value.

27. The non-transitory computer-readable storage medium of claim 26, wherein determine an upper value and a lower value based at least in part on adding a third operand to one of the upper intermediate value or the lower intermediate value comprises:
   in response to a sign of the intermediate value being the same as a sign of the third operand, and in response to an exponent of the intermediate value being greater than an exponent of the third operand by more than a specified threshold:
      setting the upper value to the upper intermediate value, and
      determine the lower value by rounding to nearest odd a sum of the lower intermediate value and the third operand.

28. The non-transitory computer-readable storage medium of claim 26, wherein determine an upper value and a lower value based at least in part on adding a third operand to one of the upper intermediate value or the lower intermediate value comprises:
   in response to a sign of the intermediate value being the same as a sign of the third operand, and in response to an exponent of the intermediate value being greater than an exponent of the third operand by fewer than a specified threshold or the exponent of the intermediate value being equal to or less than the exponent of the third operand:
      determine the upper value by rounding to nearest even a sum of the upper intermediate value and the third operand, and
      determine the lower value to 0.0.

29. The non-transitory computer-readable storage medium of claim 26, wherein determine the upper value and the lower value based at least in part on adding a third operand to one of the upper intermediate value or the lower intermediate value comprises:
   in response to a sign of the product being different from a sign of the third operand, and in response to an exponent of the intermediate value being greater than an exponent of the third operand by a specified threshold:
      setting the upper value to the upper intermediate value, and
      determine the lower value by rounding to nearest odd a sum of the lower intermediate value and the third operand.

30. The non-transitory computer-readable storage medium of claim 26, wherein determine an emulated fused multiply-add result for the first operand, the second operand, and the third operand further comprises:
   determine a sum of the upper value and the lower value; and
   determine to even the normalized sum of the upper value and the lower value.

* * * * *